Feb. 21, 1967 J. A. CENCEL ETAL 3,305,278

HYDROSTATIC SUPPORT BEARING

Filed June 15, 1964 3 Sheets-Sheet 1

INVENTORS:
J. Arthur Cencel
Norman E. McCoy
By Marvin H. Kleinberg
Attorney

INVENTORS:
J. Arthur Cencel
Norman E. McCoy
By Marvin H. Kleinberg
Attorney

HYDROSTATIC SUPPORT BEARING

Filed June 15, 1964 3 Sheets-Sheet 3

INVENTORS:
J. Arthur Cencel
Norman E. McCoy
By Marvin H. Kleinberg
Attorney

United States Patent Office 3,305,278 Patented Feb. 21, 1967

3,305,278

HYDROSTATIC SUPPORT BEARING

Joseph Arthur Cencel and Norman Edward McCoy, Los Angeles, Calif., assignors to Teledyne, Inc., Hawthorne, Calif.

Filed June 15, 1964, Ser. No. 374,959
7 Claims. (Cl. 308—9)

The present invention relates to magnetic memory devices and more particularly to an improved rotating disc memory of the magnetic type.

In information handling systems, a moving magnetizable surface is used for information storage. It is well known that magnetizable drums, tapes, and discs of various sorts can be utilized for this purpose. In recent years, the requirements of magnetic recording have dictated that a uniform spacing may be maintained between the magnetic transducer with which "reading" or "writing" is accomplished, and the moveable magnetizable medium on which information is stored.

Various schemes have been devised to accomplish this purpose such as contact recording techniques, in which the transducer actually is biased against the moving surface and separated therefrom by a cushion of fluid (usually air) or memories utilizing the Bernoulli effect, such as disclosed in the patent to S. Fomenko, No. 2,950,353. On the other hand, there are the conventional fixed-spacing magnetic drums, well known in the art, and, more recently, the solid discs, biased against a headplate, and separated therefrom by an air bearing which is developed by the high speed motion of the disc with respect to the backing plate.

Such a disc memory is typified in U.S. Patent No. 2,899,260 to Farrand, in which a disc is rotatably mounted on a central shaft by means of a web member having substantial radial stiffness with no appreciable axial stiffness. The backing plate, in which the heads are positioned, is lapped substantially flat and "steps" are machined into the surface to generate the air cushions or the air bearings. Means are provided to bias the disc away from the backing plate during starting and stopping and to bias the disc towards the plate once the disc is up to speed.

When the disc is rotating, the disc is moved axially toward the moving plate with substantial thrust so that a strong bias exists, forcing the disc against the backing plate. "Steps" in the lapped surface generate hydrodynamic bearings which provide an opposite bias to keep the disc away from the plate. In operation, an equilibrium is reached at a fixed spacing from the plate, thereby assuring a uniform spacing between the disc surface and the recording heads.

In the prior art devices, the necessity for axial movement and biasing of the disc has limited the available memory space to one surface of the disc. In an attempt to increase the useful recording area, the device was modified to prepare a pair of backing plates between which the disc and the plates is extremely limited and, when not rotating, the disc is frequently in contact with one or the other plates.

When running at operating speed, hydrodynamic forces are generated between each of the plates and the disc which tend to keep the disc centered between them, and therefore tends to be self-correcting. Because of the close spacing involved and the extremely small tolerances, when starting and stopping and, in the rest position, the disc is usually in contact with a plate surface. Starting and stopping then tends to wear the magnetic coating from the disc.

In such an application, clearly, axial motion of the driving shaft is not permissible and therefore, the useful life of the memory is limited by the number of start-stop cycles that can be permitted before one or more of the recording tracks is adversely affected by wear. What is needed and what has been provided by the present invention is a simple, reliable, trouble free source of fluid pressure to support the disc during starting and stopping. Such a pressure system is provided with no external connections, capable of being wholly contained within a hermetically sealed memory unit.

In accordance with the present invention, a rotatable magnetic memory is designed basically along the teachings of Farrand mentioned above, in which a disc member includes a flexible web between the hub and the outer, annular portion of the disc upon which the magnetizable medium is coated. The backing plates, including the magnetic transducer mountings, is provided with stepped depressions to produce a viscous shear or boundary lubricated air bearing which results from the spinning of the disc in close proximity (about 0.0001″) to the backing plate. Each of the magnetic heads is located in the headplate and sufficient area is provided to supply air to form the air bearing.

Considering first the operation of the disc when running, as the disc revolves, the air drawn through head slots is compressed due to the change in the gap from the recessed areas to the surface of the headplate. This pressure varies inversely with the gap and increases as the gap is decreased and decreases as the gap increases. Each headplate thus provides pressure on the disc proportional to the gap between the rotating disc and the headplate. The disc tends to be self centering, therefore, and any deviation towards a first plate increases the pressure as the gap narrows and decreases the pressure as the gap widens between the disc and the second plate thereby resulting in a net force tending to keep the disc centered between the plates.

Since the restoring pressures are a function of the relative speed between the disc and the headplates, during starting and stopping and at rest, the above described phenomena can provide little or no support to the disc. As a result, physical contact and wear between the headplate and the disc becomes a problem.

According to the present invention this problem is solved by the provision of an auxiliary pressure supply during starting and stopping. Each headplate is provided with a plurality of holes, each located in a region of maximum hydrodynamic pressure. Concentric with each hole is located a small diameter tube ending in series with the hole. Each tube is connected, through suitable tubing and manifolds, to a common tank which stores a suitable fluid. While the disc is rotating in normal operation, the pressure in the tank is made to equal the average pressure between the disc and the headplates.

The relative size of each tube opening with respect to each hole is such that with the disc centered and non-rotating, approximately half of the tank pressure is dropped between the headplate and the disc and between the tube and hole. Therefore, as the disc approaches a headplate, the fluid flow is decreased, decreasing the pressure drop through the series of restrictions which increases the pressure between the headplate and the disc, thereby forming a restoring force. When the disc is decelerating during stopping, the volume of fluid stored under pressure in the tank is sufficient to maintain the disc to headplate spacing until the disc comes to rest.

During start up, it must be assumed that a pressure equilibrium exists throughout the memory system such that there is no differential sufficient to support the disc away from the headplate. In accordance with the present invention, a heater coil is provided within the tank which is controlled by a pressure switch. When the memory system is energized, the heater coil is connected first to a source of power. The heater coil is of sufficient thermal capacity to cause a rapid temperature rise within the tank, thereby causing a pressure buildup of the stored fluid. When the pressure exceeds a value sufficient to support the disc through the plurality of orifices, *a pressure switch* is actuated which simultaneously turns off the heater and energizes the motor.

As the disc accelerates, fluid pressure is generated by the hydrodynamic bearings and as this pressure increases beyond the pressure in the tank, additional fluid is pumped into the tank, further accelerating the cooling started by the de-energization of the heater unit. As the disc comes up to speed, the pressure in the tank is increased until it is at equilibrium with the hydrodynamic pressure of the disc and plate.

The heater is carefully designed to provide sufficient tank pressure to support the disc until the rotating disc can maintain itself. The pressure switch also must be carefully set to avoid a detrimental cycling of the heater and motor, since the pressure switch alternatively connects the source of power to the heater or the motor. If the volume of the tank or the thermal capacity of the heater were inadequate, then the pressure switch would go into oscillation at a very slow rate, alternately connecting the heater and then the motor. Conceivably, the motor could never reach a speed adequate to provide sufficient pressure to support the disc.

In an alternative embodiment of the invention, utilizing only a single recording surface of the disc, an apparatus can be prepared substantially identical to that disclosed by Farrand in the above identified patent, with the modification that the solenoid circuit is eliminated and the disc is permanently pre-loaded against the headplate. In accordance with the present invention, the pressure tank is provided to supply sufficient fluid pressure at the restrictive orifices to support the disc away from the surface of the headplate. When turning on the memory, a pressure switch initially connects the source of power to the heater circuits until the pressure in the tank reaches a value sufficient to support the disc. The pressure switch is then energized which disconnects the power source from the heater and connects it, instead, to the motor circuits. The motor is energized and the disc begins to rotate. As the disc comes up to speed, the pressure generated by the hydrodynamic bearings increases until it exceeds the pressure in the tank at which time the disc becomes self supporting and the tank pressure is built up by contributions from the hydrodynamic bearings of the disc. This pressure buildup also facilitates cooling of the heater element without any loss in supporting pressure for the disc. Accordingly, it is an object of the invention to provide a hermetically sealed rotatable memory system utilizing hydrodynamic bearings.

It is a further object of the invention to provide a magnetic memory system containing an integral pressure system for starting and stopping in conjunction with the hydrodynamic bearing system.

It is yet another object of the invention to provide a self-contained pressure system to supplement a magnetic disc memory during starting and stopping.

It is still another object of invention to provide a self-contained heremetically sealed magnetic memory system having a pressure generator without moving parts.

It is still another object of invention to provide a hermetically sealed magnetic memory system including a storage tank to provide a supporting pressure system during starting and stopping of the memory.

It is still a further object of the invention to provide a hermetically sealed rotatable simple disc memory, both surfaces of which are utilized for magnetic recording.

It is still another object of invention to provide a hermetically sealed magnetic memory system of the hydrodynamic pressure type with no external pressure connections.

It is still yet another object of invention to provide a hermetically sealed magnetic memory system suitable for use in any orientation under any environmental conditions.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

Figure 1:
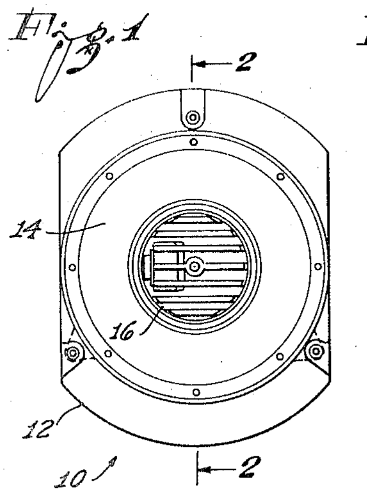
FIG. 1 is a top view of a magnetic disc memory according to the present invention.
Figure 2:
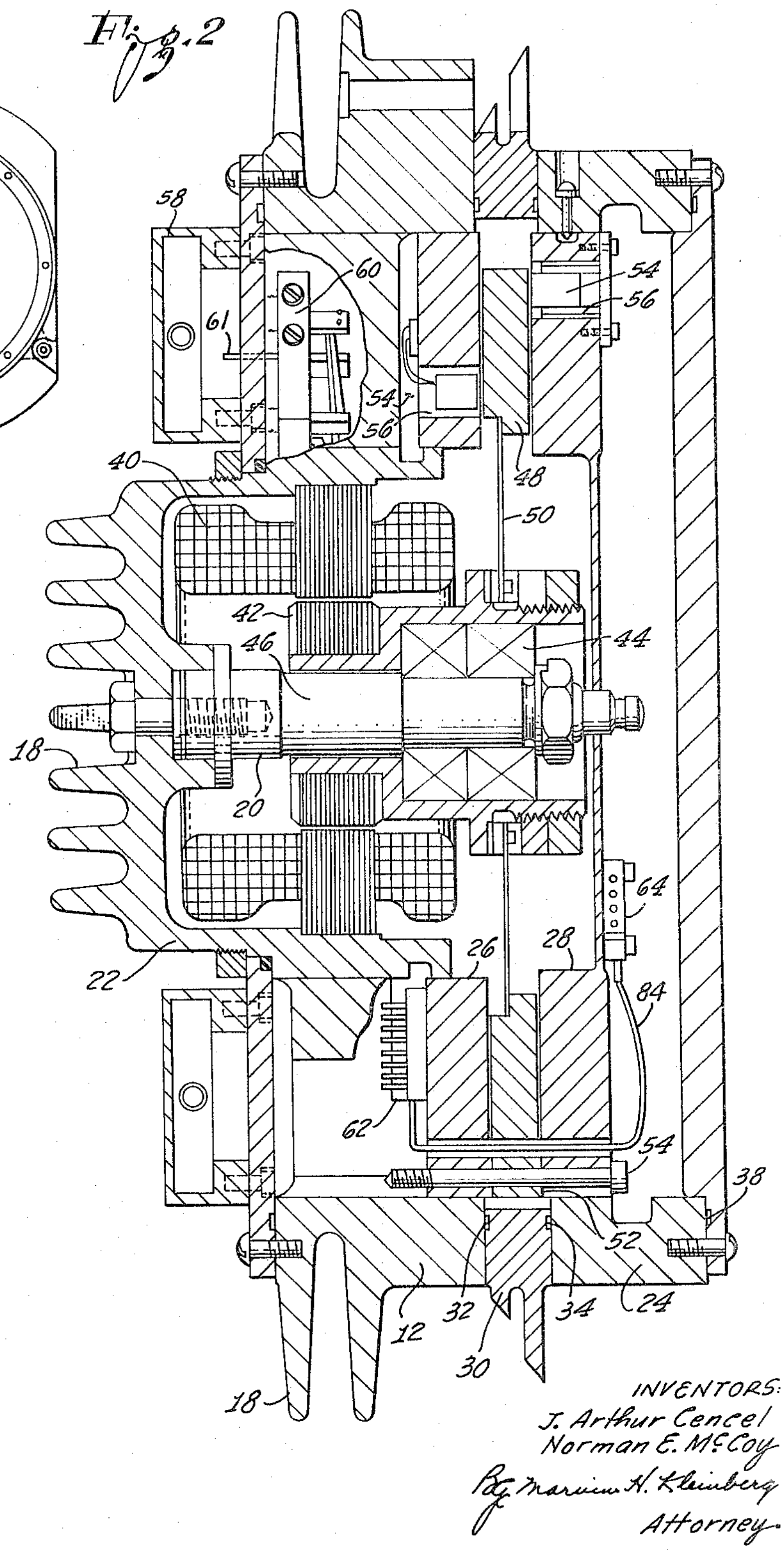
FIG. 2 is a side sectional view of the device of FIG. 1 taken along line 2—2 in the direction of the appended arrows.
Figures 3, 4A, 4B, 5, 6, 10:
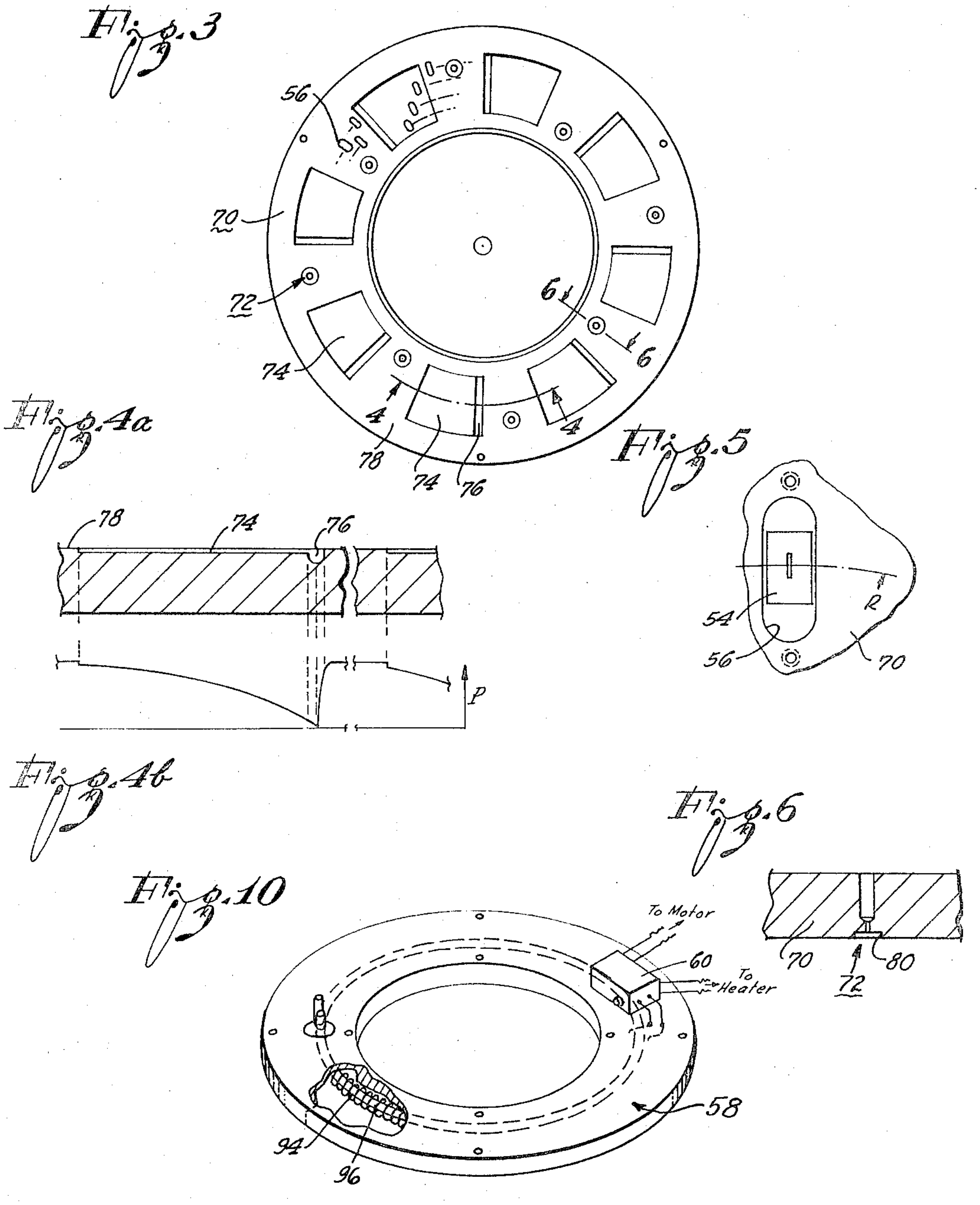
FIG. 3 is a top view of a headplate for a disc memory according to the present invention.
Figure 8:
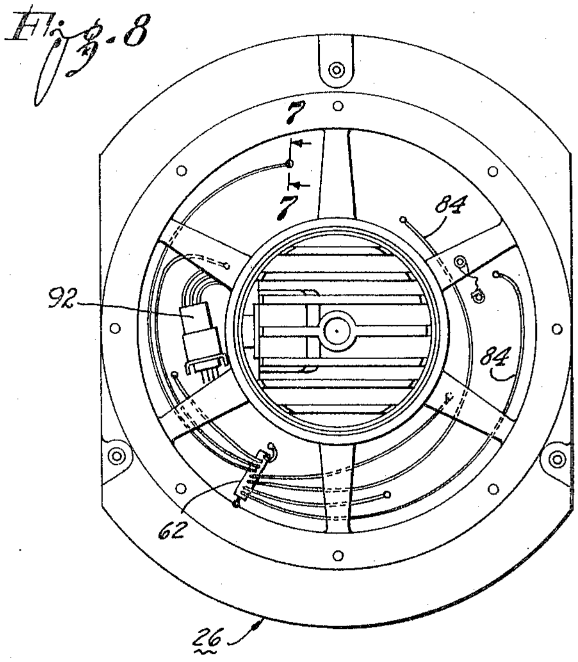
Figure 7:
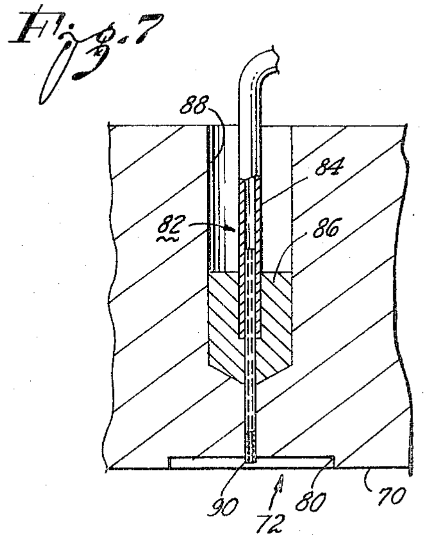
Figure 9:
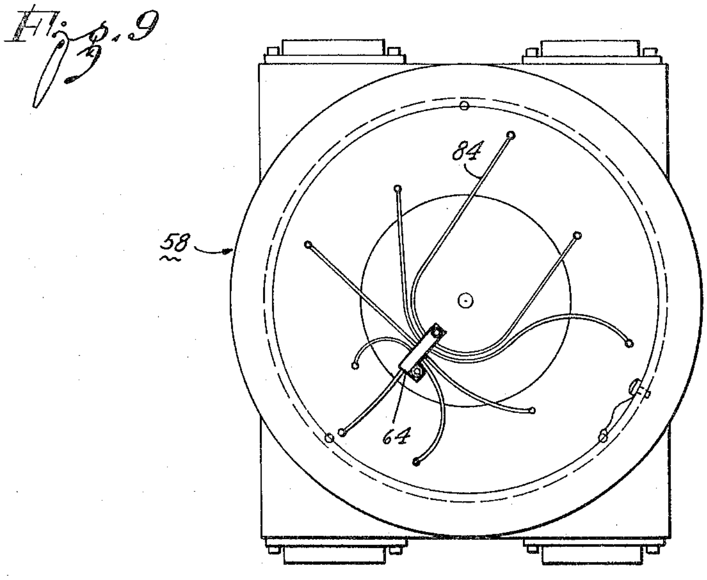

FIG. *4a* is a sectional view of a hydrodynamic bearing surface of the plate of FIG. 3 taken along line 4—4 in the direction of the appended arrows;

FIG. *4b* is a graph illustrating the hydrodynamic pressure profile of the bearing surface of FIG. *4a*;

FIG. 5 is an enlarged view of a head mounting orifice in the headplate of FIG. 3, slightly enlarged to show a magnetic transducer positioned therein;

FIG. 6 is a side sectional view of a cushioning orifice in the headplate of FIG. 3 taken along lines 6—6 in the direction of the appended arrows;

FIG. 7 is an enlarged side sectional view of an orifice together with means for supplying fluid, taken along lines 7—7 of FIG. 8;

FIG. 8 is a bottom view of the memory of FIG. 1;

FIG. 9 is a view of the memory of FIG. 1 with the cover plate removed therefrom; and FIG. 10 is a perspective view, partly broken away, of the fluid supply tank of FIG. 2.

Turning first to FIG. 1, there is shown a top view of a completely assembled magnetic memory system including a main housing 12, and a protective cover 14, which includes an open work grill 16, to permit circulation of air throughout the main housing 12. The memory system is better seen in the side sectional view of FIG. 2 which, for convenience, shows the memory with the protective cover 14 removed.

From FIG. 2, it may be seen that the memory includes the main housing 12, which is provided with integral cooling fins 18, around the circular periphery thereof and over the portion enclosing a rotor and shaft assembly 20, and an upper and lower headplate 26, 28, respectively. The upper and lower portions of the housing are separated by spacer 30, which includes upper and lower seals 32, 34, for maintaining an isolation between the interior of the housing and the surrounding atmosphere.

A bottom cover plate mounts on the lower housing to protect the lower headplate 28, and is provided with a cover plate seal 38, to maintain the isolation.

Integral with the upper housing member 22, is a stator coil 40, which, when energized, causes rotation of a rotor 42, which is mounted on suitable bearing members 44 to a central shaft 46.

A magnetizable disc 48 is mounted on the rotor 42 by a relatively thin, flexible web element 50 which is radially stiff, but permits motion of the disc 48 in an axial direction.

Shown, but not described, are the various mechanical elements for interconnecting the various parts and holding them in the assembly, together with the various seals that are provided to maintain the interior of the memory fluid tight. The separation between the headplates 26, 28, is maintained by three precision spacers 52, one of which can be seen near the bottom of FIG. 2, held in place by a spacer bolt 54.

The magnetizable disc 48 rotates in close proximity to the upper and lower headplates 26, 28 in which are mounted suitable magnetic transducers. The transducers 54 are electrically connected to external circuits which apply signals to and receive signals from the magnetic memory unit. It will be noted that the magnetic transducer 54 is positioned in a cut-out portion 56 of the headplate 28 which is a part of the "fluid" recirculating system of the memory unit.

The various elements of the fluid pressure system of the present invention are also shown in FIG. 2. They include a reservoir tank 58 which is mounted on the upper headplate 26. A pressure switch 62 is mounted immediately below the tank and communicates with it through a small diameter tube 61, in a manner to be described below. An upper manifold 62 is mounted on the upper headplate 26 and a lower manifold 64 is mounted on the lower headplate 28. Flexible tubing, not shown, provides fluid under pressure from the reservoir tank 58 to the upper manifold 62. The upper and lower manifolds 62 and 64 are connected by a section of flexible tubing 84 and other sections of flexible tubing (not shown) to apply fluid pressure to various orifices distributed throughout the upper and lower headplates.

The individual elements of the pressure system are treated in greater detail in FIGS. 6 through 10, described below.

Turning now to FIG. 3, there is shown a view of a typical headplate 70 showing the various operative elements. The upper and lower headplates 26, 28, in their operative surfaces are substantially similar, and differ only in the placement and location of cut-out portions 56, in which transducers 54 are to be mounted, or in the placement of fluid pressure orifices 72 which connect to the fluid pressure system.

The headplate 70 is provided with a plurality of hydrodynamic bearing surfaces 74 which are shown in vastly expanded scale in the view of FIG. 4*a*.

In both FIGS. 3 and 4*a*, the scale in the vertical or depth dimension is exaggerated since the actual depth of the step shown in approximately .0005 inch. Looking at the plate 70 as viewed in FIGS. 3 and 4*a*, the hydrodynamic bearing surfaces are designed to accommodate a magnetic disc rotating in a clockwise direction as viewed in FIG. 3, or from right to left, as viewed in FIG. 4*a*.

At the leading edge of the bearing surface, 74, a semicylindrical recess 76 is provided which is optional and is not necessary to satisfactory operation. The recess 76 initiates an area of relatively low pressure which then gradually builds up over the bearing surface 74 and reaches a maximum over the remaining flat surface area 78 of the disc. This "maximum" pressure obtains in all areas except in the hydrodynamic bearing surfaces themselves. An analysis of pressure as a function of position on the surface of the headplate is shown in FIG. 4*b*. As shown, the pressure starts at a low at the recess 76 and builds up.

Turning to FIG. 5, a typical magnetic transducer 54 is shown positioned in one of the cut-out portions 56, in a headplate surface 70, of one of the headplates, for example, the upper headplate 26. The cut-out portion is used to permit a flow of hydrodynamic fluid, from the rear to the rear surface of the headplate. These cut-out portions 56 are the primary source of hydrodynamic fluid in the area between the headplate and the rotating disc. 48.

Turning to FIG. 6, there is shown a cross-section of the headplate 70 which provides the fluid cushion from the supplemental pressure system and includes a circular depression 80.

FIG. 7 more clearly shows this recess 80 and a restriction assembly 82 mounted therein. The restriction assembly 82 includes a first outer cylindrical tube 84 to which is attached the flexible tubing leading to the upper manifold 62. The cylindrical member 84 is mounted in a plug member 86 which is mated to the recess 88 in the reverse side of the headplate 26. Concentric and coaxial with the cylindrical tubing 84 is a second smaller cylindrical fluid tubing 90 which protrudes and discharges the fluid into the area of the recess 80. It is this extremely fine guage cylinder, which communicates fluid between the fluid supply tank 58 and the volume in which the rotatable disc 48 operates.

The hydrostatic cushion bearing may be adapted to maintain a specified spacing between the disc and the headplate. For example, if it is desired to support the disc 0.0002 inch from the headplate, the recess 80 may be in the form of a cylindrical chamber of approximately 0.25 inch diameter, and a depth of approximately 0.025 inch, while the cylindrical restriction 90 may have a diameter of approximately 0.003 inch.

FIG. 8 shows, in better detail, the upper headplate 26 as viewed from above with the fluid tank 58 removed. The plurality of flexible cylindrical tubes, 84 converge upon the upper manifold 62 which in turn connects to the tank 58 (not shown). Also illustrated is an electrical connector 92 through which power and signal connections can be made to the entire assembly.

In FIG. 9, there is seen the reverse side of the lower headplate, 28, and the plurality of flexible, cylindrical tubes 84 leading to the lower manifold 64 which is connected by a similar flexible, cylindrical tube through the top plate to the upper manifold 62.

FIG. 10 illustrates, in slightly better detail, the fluid pressure tank 58 and shows a heating element 94 disposed within the interior of the tank. The heating element 94 includes a circular rod which forms a circle concentric with the tank and about which is wound a filament 96 of relatively high resistivity, which, when electrically energized, generates sufficient heat to raise the fluid pressure within the tank 58. Also mounted upon the tank and integral with it is the pressure switch 60 which can be set to provide a first switch configuration at a first pressure and a second switch configuration at a second, different pressure.

In conjunction, therefore, the switch 60 operates to energize the heating element 94 whenever the pressure falls below the preset limit, and which de-energizes the heating element 94 when the pressure rises above a second, preset limit, at the same time energizing the circuits which provide rotational energy to the rotor 42.

In a preferred embodiment, the pressure switch is designed with a restriction (such as the small diameter tube 61 shown in FIG. 2) in the opening to the pressure tank which permits a pressure lag inside the switch when the pressure is building up in the tank. The switch is set to trip into the heater OFF-motor ON configuration at a static pressure which is lower than that occurring in the tank during pressure build-up. That is, the pressure within the tank will have reached a higher pressure than that necessary to trip the switch.

This has three functions:

(1) It permits the pressure build-up in the tank before start-up to be greater than that produced during running, and without the problems associated with a strictly toggle action switch in the presence of shock and vibration;

(2) It prevents unnecessary on-off cycling of the unit during start up in the event of leakage before the unit reaches full speed or the pressure drop due to heat losses before the pumping action has had time to stabilize;

(3) It permits time to be traded off for pressure while maximizing protection during rapid on-off cycling of power if done intentionally.

Each time the unit is turned on, the temperature of the air inside the tank and that of the tank itself increases.

If not allowed to cool, the next cycle must start from this elevated temperature to produce the same pressure, requiring a longer time interval. When the temperature of the external surroundings is closer to that of the tank, the pressure drop due to cooling of the fluid by the tank is reduced. Once pressure in the tank is built up, the normal trip pressure on the switch will be reached without the greater build up in the tank. Since the entire system is at an elevated temeprature, the pressure in the tank will be adequate to support the disk in the absence of the head loss pressure drops.

In recapitulation, and to review the operation of the apparatus, if initially at rest, it may be assumed that the fluid pressure within the tank equals the fluid pressure in the area of the magnetic disc and the rotor is at rest. The disc is substantially unsupported and the relatively flexible web 50 may permit the disc to rest against one of the headplates, depending upon the orientation of the entire assembly with respect to gravity.

If now electrical energy is applied to the system, the pressure switch 60 connects the source of potential energy to the heater coil 96 of the heating element 94 which proceeds to add heat to the fluid in the tank 58. As the fluid pressure within the tank 58 increases, fluid pressure is applied through the upper and lower manifolds 62 and 64, and through the orifices 72. When a sufficient pressure differential exists between the tank and the area between the headplates, a fluid bearing is formed sufficient to support the disc between the headplates.

The heat holding capacity of the heating element 94 is adequate to maintain pressure sufficient to support the disc, after the pressure switch 60 has actuated and the electrical energy to the heating element 94 has been interrupted, and until the energization of the rotor and stator assembly brings the disc up to speed adequate for the hydrodynamic bearings 74 to generate fluid pressure to maintain the disc in a supported condition between the headplates.

As the speed of the disc increases, the pressure generated by the hydrodynamic bearings 74 increases and soon exceeds the pressure of the tank 58. At this point in time, the combination of the tank cooling off and the pressure at the disc building up, allows a pressure differential to exist between the tank 58 and the front surface of the headplate. This differential causes fluid to flow into the orifices 72 toward the tank 58, effectively pumping fluid into the tank to equal the pressure developed by the disc rotating between the headplates.

During normal operation, therefore, the pressure in the tank, 58, equals that between the headplates, and the disc is supported, equidistant between the headplates. Any tendency to approach either plate is compensated for by restoring hydrodynamic pressures.

For stopping, the electrical power to the system is interrupted and the motor is de-energized. The disc then slows in its rotation, and the fluid pressure, generated by the hydrodynamic bearings, diminishes until it is unable to support the disc. However, the fluid pressure in the tank does not drop so rapidly and is able to provide a fluid cushion which supports the disc until after the disc ceases to rotate. As the pressure within the tank drops, the pressure switch may assume its other stable configuration.

If the power is reapplied *before* the pressure switch trips, sufficient fluid pressure to support the disc exists and the motor system may be re-energized. If, however, the pressure switch is in its *other* stable configuration, there is insufficient pressure to support the disc and reapplication of power then energizes the hearing element instead, which builds up the pressure.

Thus there has been provided a rotatable disc memory utilizing air bearings to stabilize the magnetizable disc at a predetermined spacing from magnetic transducers mounted in headplates. A supplementary supply of fluid pressure is provided so that the disc is supported away from the headplates at all times during rotation, and surface wear is avoided during starting and stopping of the disc.

Other variations will appear to those skilled in the art, and the present invention should be limited only by the scope of the appended claims.

What we claim as new is:

1. In a magnetic memory disc device having a head plate, rotatable disc, means adapted to rotate the disc and means for establishing hydrodynamic fluid bearings when the disc rotates at speeds in excess of a predetermined speed, supporting means for maintaining a spacing between the disc and the head plate at less than the predetermined speed, the supporting means comprising:

a plurality of orifices in the head plate, each orifice adapted to provide, in response to applied fluid under pressure, a hydrostatic fluid cushion for supporting the adjacent portion of the disc;

fluid supply means commonly connecting said orifices; and reservoir means connected to said fluid supply means for applying fluid under pressure to said orifices, said reservoir means being operable to receive fluid under pressure from hydrodynamic fluid bearings created by disc rotation until pressure equilibrium is established between fluid in said reservoir means and hydrodynamic fluid pressure existing between the disc and the head plate, said plurality of orifices being adapted to provide, during disc deceleration, full support for the disc for a time sufficient to enable the disc to substantially cease rotation, from fluid stored in said reservoir.

2. In a magnetic memory disc device including a rotatable disc, first means adapted to rotate the disc, a relatively fixed head plate and second means for creating a lubricating, fully supporting hydrodynamic fluid bearing between the disc and the head plate at disc rotational speeds greater than a predetermined rotational speed, third means for generating a supporting, hydrostatic fluid bearing between the disc and the head plate at all speeds less than the predetermined speed, said third means comprising:

a plurality of fluid supply orifices in the head plate adjacent the disc, each of said orifices being operable in response to an applied fluid under pressure to support the portion of the disc adjacent said orifice, conduit means commonly connecting all of the said orifices; and fluid supply means, including reservoir means, connected to said conduit means for supplying fluid under pressure thereto, said reservoir means being adapted to store a supply of compressible fluid for application to said orifices, and fluid heating means connected to said reservoir means for applying heat energy to said reservoir means to increase the pressure of fluids stored therein, said reservoir means being adapted to store a quantity of fluid which when pressurized by application of heat energy by said heating means and applied through said orifices, is sufficient to provide support to the disc for a period of time adequate to enable the disc to accelerate from rest to said predetermined rotational speed.

3. In a magnetic memory disc device of claim 2 above, further including pressure responsive switch means, connected to the first means and said heating means, connected to the first means and said heating means and adapted to be coupled to a source of energy, for alternatively connecting the source of energy with the first means and said heating means, said switch means being operable in response to relatively low fluid pressure in said reservoir means for applying energy to said heating means and being operable in response to relatively high fluid pressure in said reservoir means for applying energy to the first means.

4. In a magnetic memory disc device of claim 2 above, wherein reservoir means are operable to receive fluid under pressure from the second means to establish pressure equilibrium between said reservoir means and the second means, said reservoir means and, said plurality of orifices being adapted during disc deceleration, to provide full hydrostatic support for the disc for a time sufficient to enable the disc to substantially cease rotation, from fluid stored in said reservoir under hydrodynamic fluid pressure.

5. In a magnetic memory disc device including a rotatable disc, first means adapted to rotate the disc, a relatively fixed head plate and second means for creating a lubricating, fully supporting hydrodynamic bearing between the disc and the head plate while the disc is rotating at speeds greater than a predetermined rotational speed, third means for generating a supporting, hydrostatic fluid bearing between the disc and the head plate at all speeds less than the predetermined speed, the third means comprising:

a plurality of hydrostatic cushion bearings for supporting the disc away from the head plate, each including fluid reservoir means for storing fluid under pressure;

a first restriction adapted to be connected to a source of fluid maintained at a first relatively high fluid pressure;

means connecting said first restriction into a cylindrical orifice in the head plate, the diameters of said restriction and said orifice being related for equally dividing the pressure differential between the first relatively high fluid pressure source and the environment of the hydrodynamic bearing, one half of the total pressure drop between the source and the environment is being developed between said restriction and said orifice, and the second half of the total pressure drop being developed between said orifice and the adjacent memory disc environment;

means commonly coupling a plurality of said first restrictions to said fluid reservoir means; and fluid heating means connected to said fluid reservoir means for pressurizing fluid stored therein to provide fluid to said hydrostatic cushion bearings for supporting the disc during acceleration of the disc from rest to the predetermined speed;

said reservoir means and said hydrostatic cushion bearings being operable, during rotation of the disc for storing fluid under hydrodynamic pressure in said reservoir means, whereby, during disc deceleration, sufficient fluid pressure is maintained in said reservoir means for supporting the disc by said hydrostatic cushion bearings during deceleration of the disc from the predetermined speed to rest.

6. In a magnetic disc memory device including a rotatable disc and a relatively fixed head plate, a hydrostatic cushion bearing adapted to maintain a spcing between the disc and the head plate of approximately .0002 inch in an environment having a first relatively low fluid pressure, the bearing comprising:

first means including reservoir means for supplying fluid under pressure;

a cylindrical chamber in the head plate having a diameter of approximately .25 inch, and a depth of approximately .025 inch;

a cylindrical restriction, coaxial with said cylindrical chamber of a diameter of approximately .003 inch;

means connecting said first means and said restriction for applying fluid under pressure thereto;

and means for pressurizing fluid in said first means at a second relatively high fluid pressure whereby fluid under pressure applied through said restriction to said chamber creates a pressure of approximately one half the difference between said relatively high and the relatively low pressure and whereby said chamber provides spacing support to the disc.

7. In a magnetic memory disc device having a head plate, rotatable disc, means adapted to rotate the disc and means for establishing hydrodynamic fluid bearings when the disc rotates at speeds in excess of a predetermined speed, supporting means for maintaining a spacing between the disc and the head plate at less than the predetermined speed, the supporting means comprising:

a plurality of cylindrical chambers in the head plate, each approximately .250 inch in diameter and .025 inch in depth, each chamber being adapted to provide in response to applied fluid under pressure, a hydrostatic fluid cushion for supporting the adjacent portion of the disc, all of said chambers being adapted to provide total support for the disc;

a corresponding plurality of cylindrical restrictions, each coaxial with one of said chambers, each of said restrictions being approximately .003 inch in diameter;

fluid supply means commonly connecting said restrictions; and reservoir means connected to said fluid supply means for applying fluid under pressure to said restrictions, said reservoir means being adapted to store a quantity of fluid under pressure, said plurality of chambers being adapted to support the disc at a spacing from the head plate of approximately .0002 inch for a time sufficient to enable the disc to substantially cease rotation, during deceleration from fluid stored in said reservoir, and, during acceleration, for a time sufficient to enable the disc to achieve the predetermined speed.

References Cited by the Examiner

UNITED STATES PATENTS

| | | | |
|---|---|---|---|
| 2,937,294 | 5/1960 | Macks | 308—9 |
| 3,047,869 | 7/1962 | Marcum et al. | |
| 3,063,039 | 11/1962 | Taft | 308—8 |
| 3,193,334 | 7/1965 | Porath | 308—9 |
| 3,223,463 | 12/1965 | Porath | 308—9 |

OTHER REFERENCES

Design of Hydrostatic Bearings, published in Machine Design August 15, 1963, pages 122 thru 125 relied upon.

EDGAR W. GEOGHEGAN, *Primary Examiner.*

FRANK SUSKO, *Examiner.*